Figure 2B:
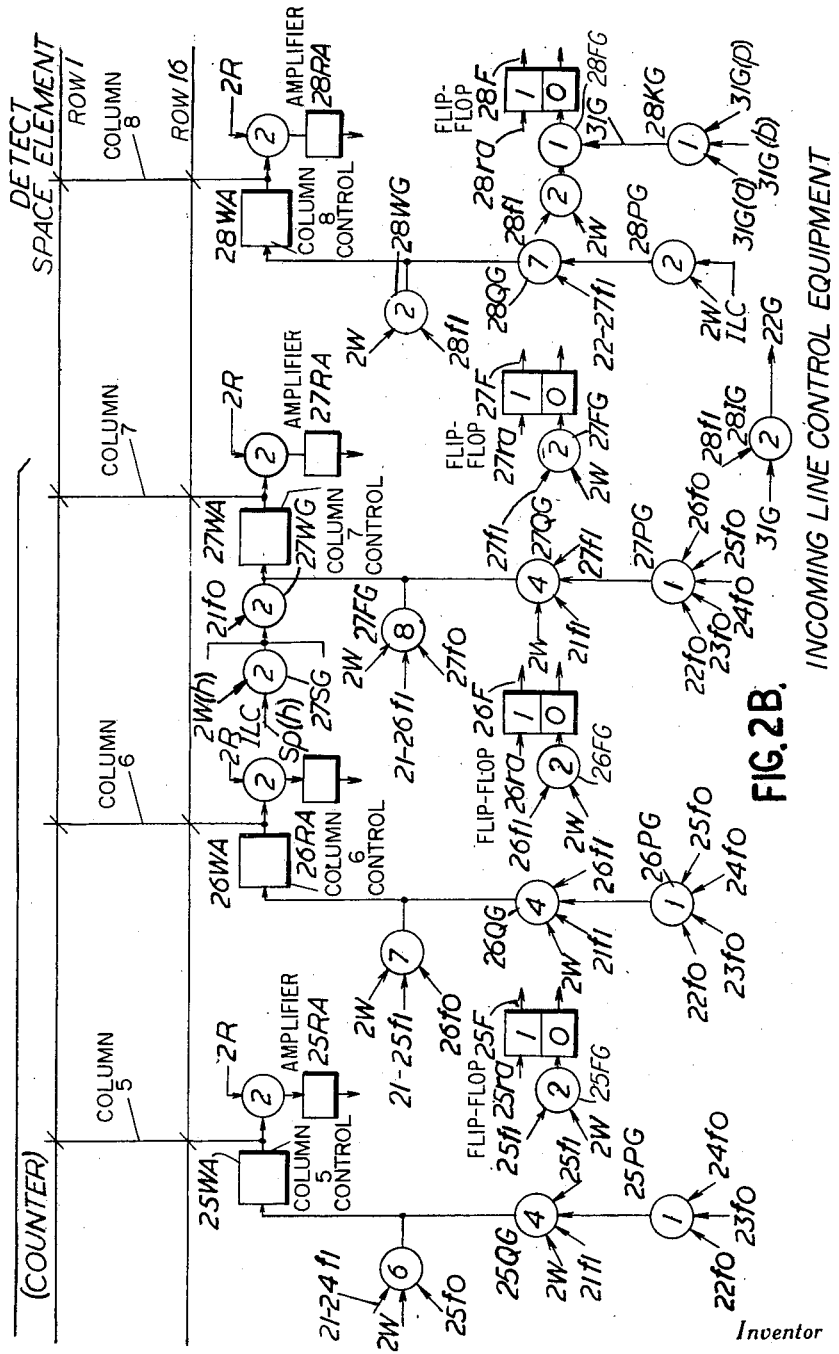

Feb. 6, 1962 E. P. G. WRIGHT 3,020,336
DATA-PROCESSING SYSTEMS
Filed Jan. 30, 1959 13 Sheets-Sheet 1
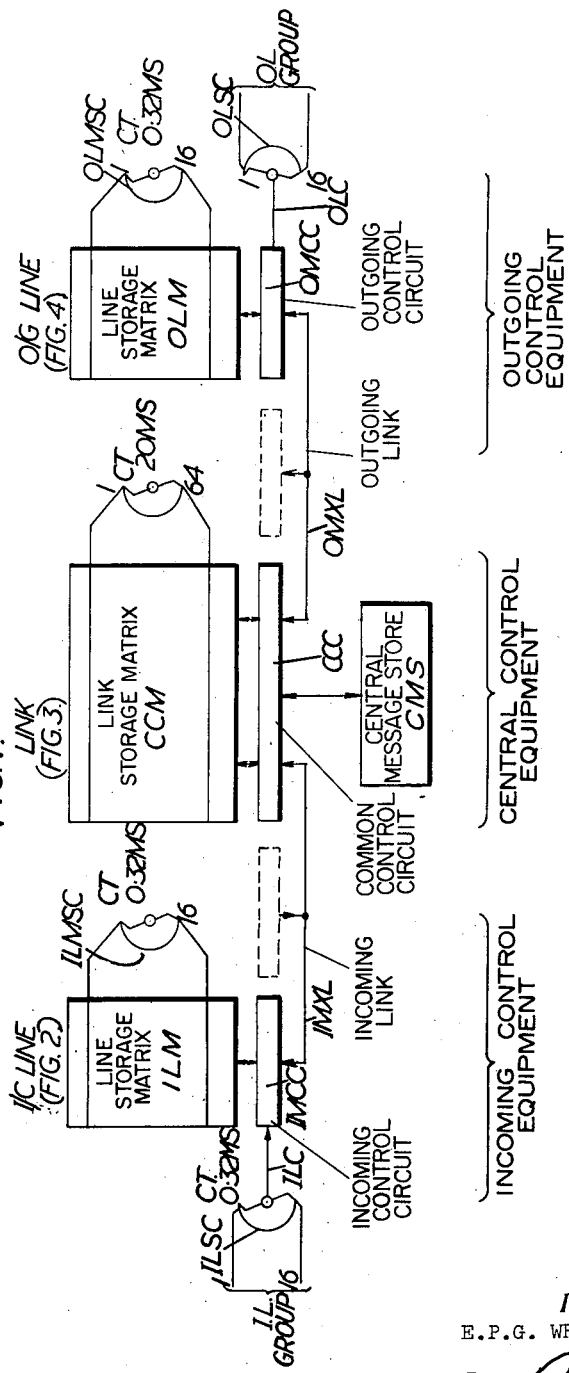
Inventor
E.P.G. WRIGHT
By
Attorney Feb. 6, 1962 E. P. G. WRIGHT 3,020,336
DATA-PROCESSING SYSTEMS
Filed Jan. 30, 1959 13 Sheets-Sheet 2
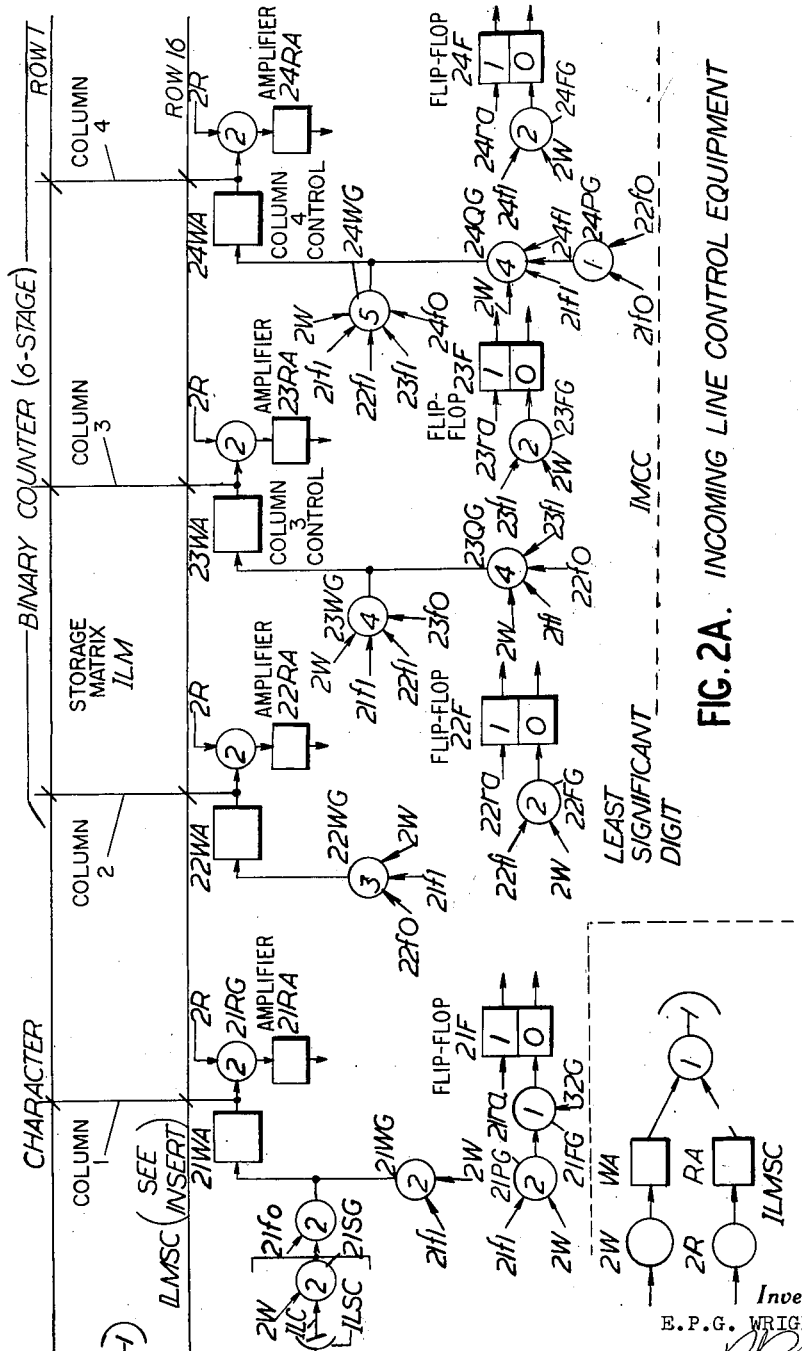
FIG. 2A. INCOMING LINE CONTROL EQUIPMENT
Inventor
E.P.G. WRIGHT
By
Attorney Feb. 6, 1962   E. P. G. WRIGHT   3,020,336
DATA-PROCESSING SYSTEMS
Filed Jan. 30, 1959   13 Sheets-Sheet 4

Inventor
E.P.G. WRIGHT
By (signature)
Attorney

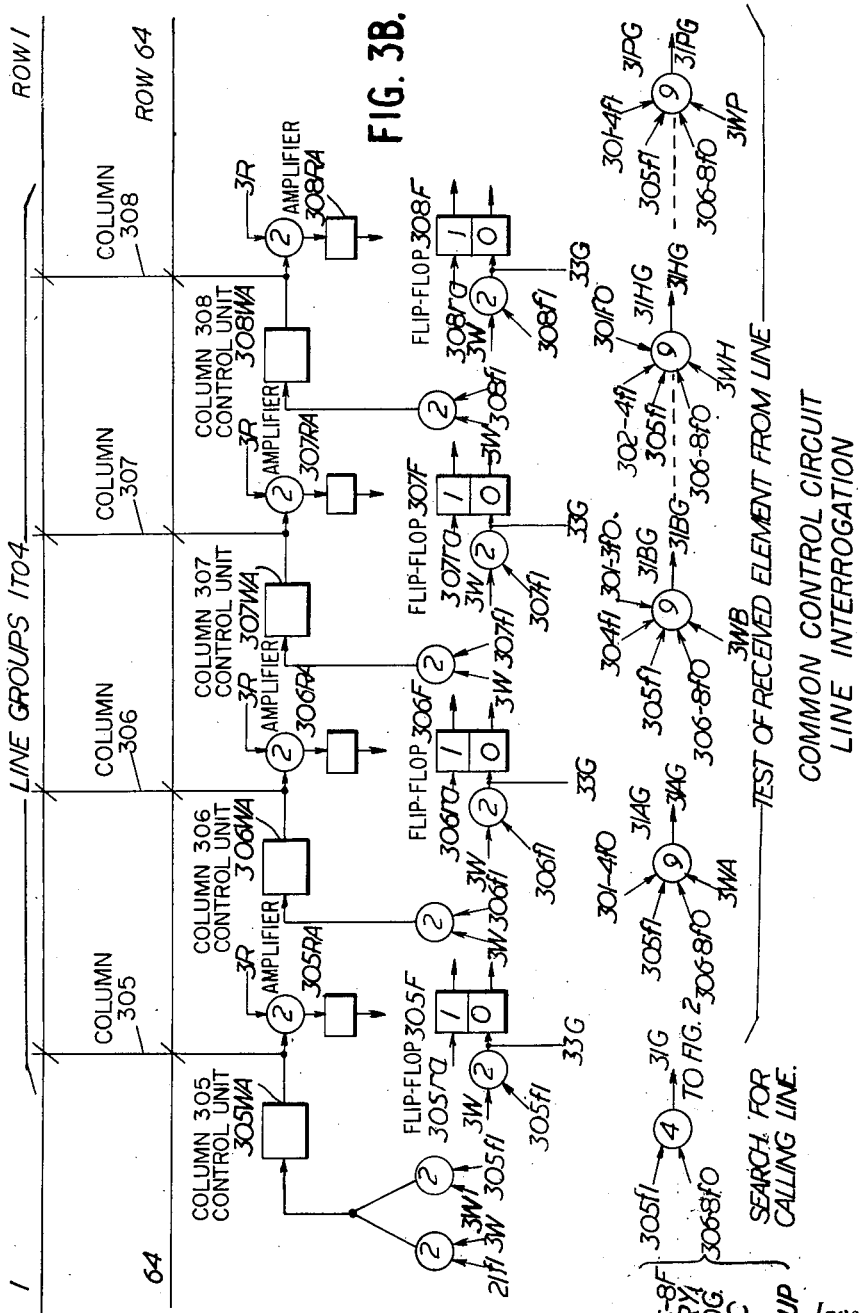

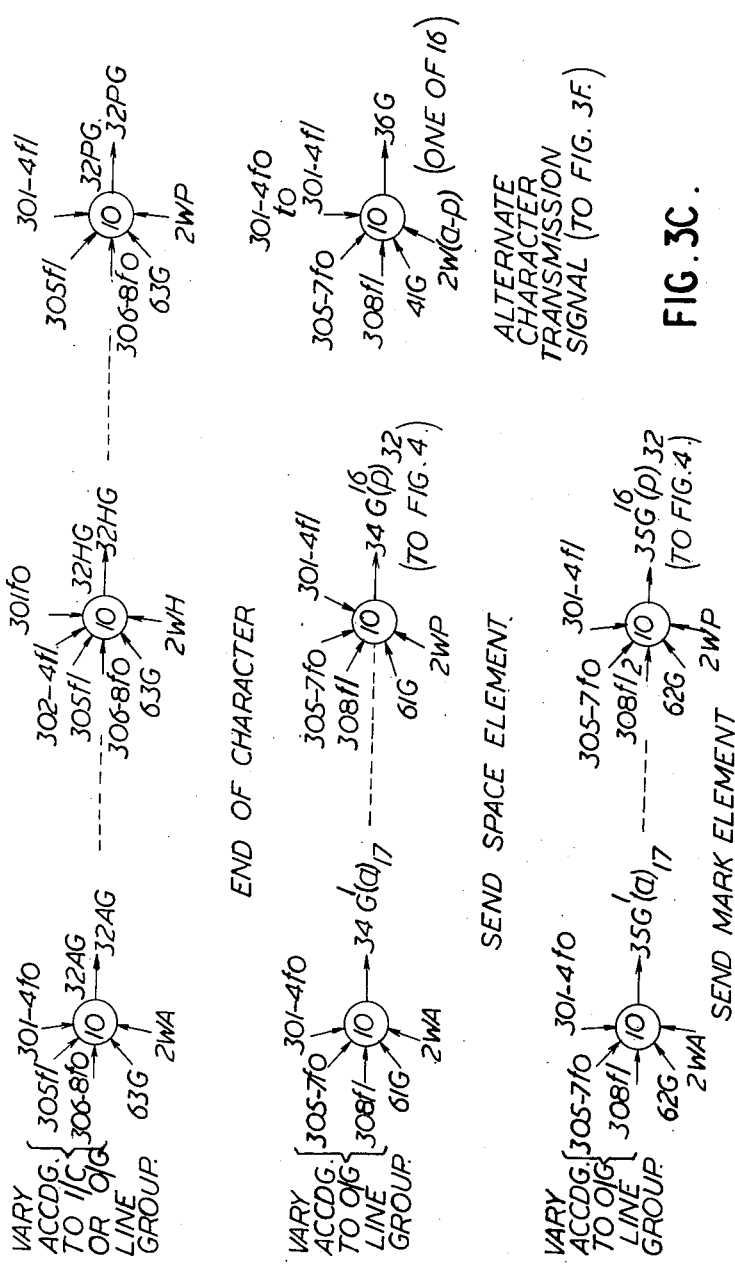

FIG. 3E.

Feb. 6, 1962    E. P. G. WRIGHT    3,020,336
DATA-PROCESSING SYSTEMS
Filed Jan. 30, 1959    13 Sheets-Sheet 9
FIG. 3F.
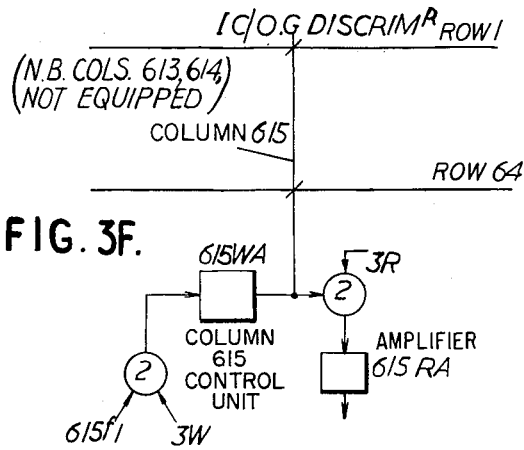
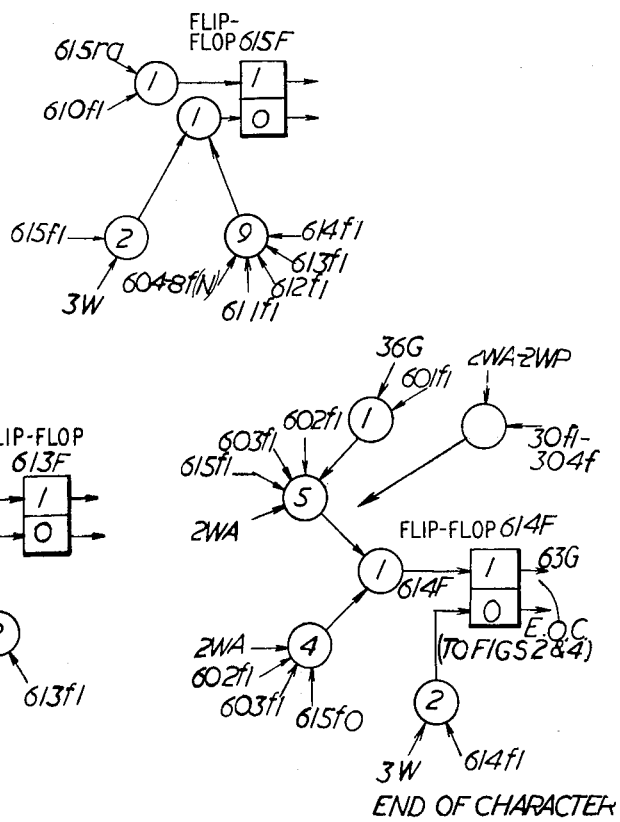
COMMON CONTROL EQUIPMENT
Inventor
E.P.G. WRIGHT
By
Attorney Feb. 6, 1962  E. P. G. WRIGHT  3,020,336
DATA-PROCESSING SYSTEMS
Filed Jan. 30, 1959  13 Sheets-Sheet 10
FIG.3G.
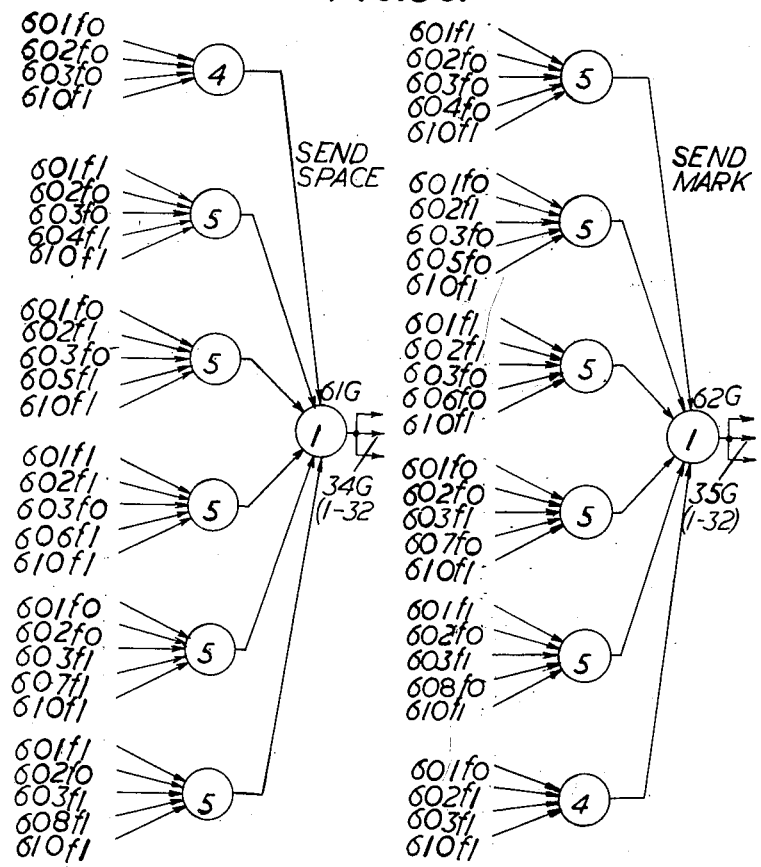
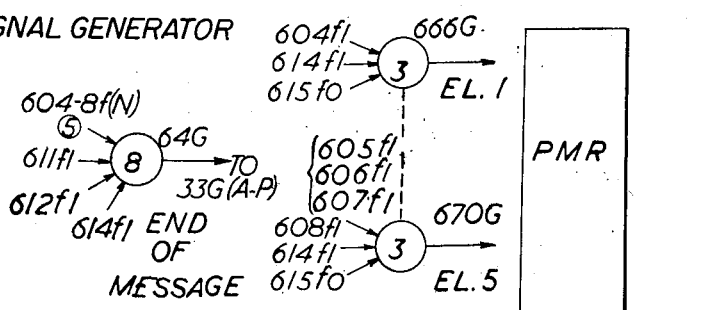
Inventor
E.P.G. WRIGHT
By *R P Morris*
Attorney

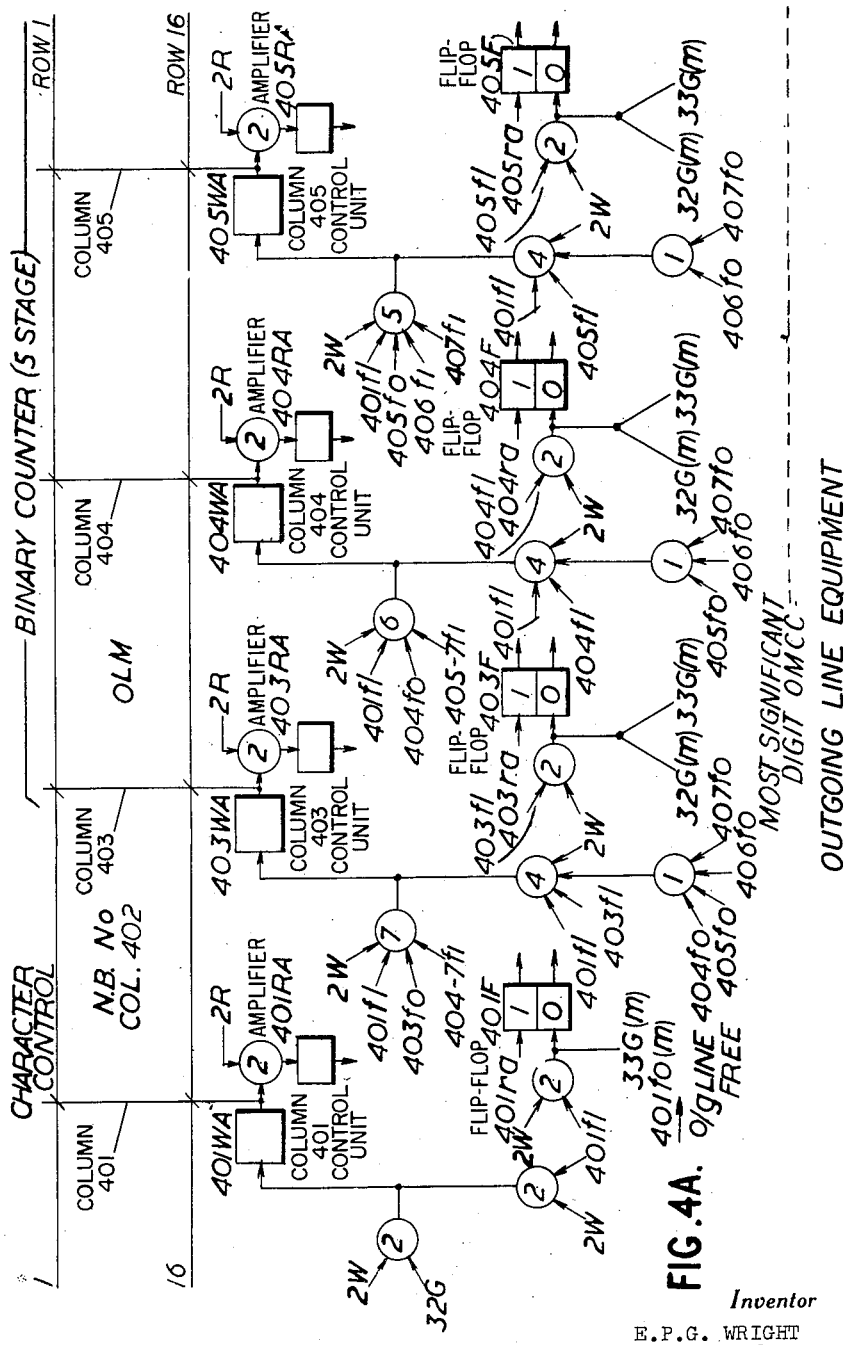

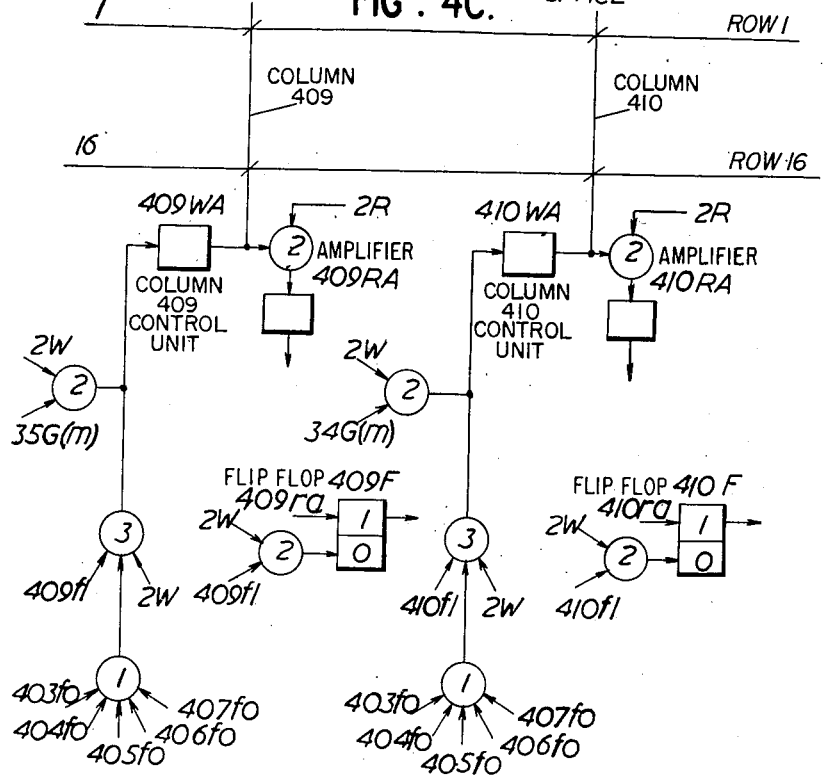
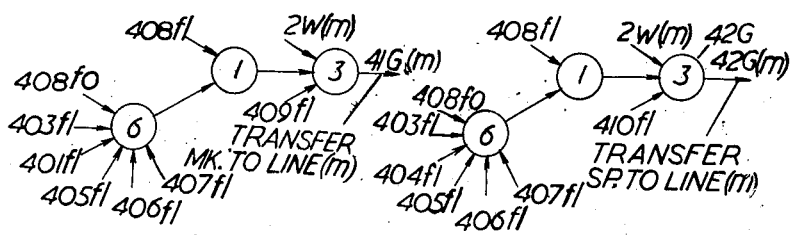
& CORRESPONDING GATES FOR ALL
OTHER LINES IN GROUP
OUTGOING LINE EQUIPMENT

3,020,336
DATA-PROCESSING SYSTEMS
Esmond Philip Goodwin Wright, London, England, assignor to International Standard Electric Corporation, New York, N.Y., a corporation of Delaware
Filed Jan. 30, 1959, Ser. No. 790,124
Claims priority, application Great Britain Feb. 6, 1958
11 Claims. (Cl. 178—2)

This invention relates to data processing systems, and in particular, but not exclusively, to teleprinter exchange systems in which messages are stored in the exchange before retransmission to an outgoing line or lines.

According to one aspect of the invention, there is provided a data processing system which comprises incoming line circuit equipment arranged to store intelligence and to respond to interrogation signals each occupying a time position in a signalling cycle characteristic of an individual incoming line circuit, which signals are received from a connecting circuit common to a group of incoming line circuits, and in response to such interrogation signals to transmit signals characteristic of the stored intelligence over the said common connecting circuit, and central storage equipment comprising interrogation signal transmitting equipment arranged to send over said common connecting circuit said interrogation signals at different time positions in said signalling cycle each characteristic of one incoming line circuit, and to receive and store intelligence signals received from said incoming line circuit equipment in response to said interrogation signals.

According to a second aspect of the invention there is provided a data processing system which comprises incoming line circuits and outgoing line circuits each of which comprises storage equipment for intelligence, and central storage equipment comprising intelligence storage equipment individual to each incoming and outgoing line circuit, a connecting circuit between said incoming line circuits and said central storage equipment, a connecting circuit between said central storage equipment and said outgoing line circuits, and intelligence transfer equipment for transferring intelligence between storage equipments individual to incoming and outgoing line circuits, whereby items of intelligence passing through the system are temporarily recorded in turn in storage equipment individual to an incoming line at the line circuit and at the central equipment, and in storage equipment individual to an outgoing line at the central equipment and at the outgoing line circuit.

According to a third aspect of the invention, there is provided a data processing system comprising input channels, output channels and a connecting circuit common to a plurality of input channels and output channels, said input and output channels being provided with individual stores for holding items of intelligence, and said connecting circuit being likewise provided with a group of stores for holding items of intelligence during processing, equipment for transferring intelligence between said individual stores and corresponding stores in said connecting circuit whereby items of intelligence may be transferred between an incoming channel and an outgoing channel, and means in said equipment for scanning said individual stores at one rate and for scanning said connecting circuit stores at a slower, but related, rate.

According to a fourth aspect of the invention, there is provided a message switching system comprising a plurality of incoming and outgoing lines and a connecting circuit for providing association under precise time control between said lines and common storage equipment, and in which the connecting circuit has a plurality of time positions at a fixed repetition rate wherein each of said time positions can be assigned for the processing of a different message incoming or outgoing over said lines.

According to yet another aspect, the invention comprises a teleprinter exchange comprising incoming line circuit equipment arranged to store fixed length portions of teleprinter intelligence and to respond to interrogation signals each occupying a time position in a signalling cycle characteristic of an individual incoming line circuit, which signals are received from a connecting circuit common to a group of incoming line circuit, and in response to such interrogation signals to transmit signals characteristic of the stored teleprinter intelligence over the said common connecting circuits, and central storage equipment comprising interrogation signals transmitting equipment arranged to send over said common connecting circuit said interrogation signals at different time positions in said signalling cycle each characteristic of one incoming line circuit, and to receive and store teleprinted intelligence signals received from said incoming line circuit equipment in response to said interrogation signals.

As a teleprinter exchange, the invention also comprises a teleprinter exchange in which incoming line circuit and outgoing line circuits each comprise storage equipment for fixed-length portions of teleprinter intelligence, and central storage equipment comprising teleprinter intelligence storage equipment individual to each incoming and outgoing line circuit, a connecting circuit between said incoming line circuits and said central equipment, a connecting circuit between said central equipment and said outgoing line circuits, and intelligence transfer equipment for transferring intelligence between storage equipments individual to incoming and outgoing line circuits, whereby a teleprinter message passing through the exchange is temporarily recorded in turn in storage equipment individual to the incoming line at the line circuit and at the central equipment, and in storage equipment individual to the outgoing line at the central equipment and at the outgoing line circuit.

The invention will now be described in conjunction with the accompanying drawings in which:

FIG. 1 is a block schematic of a complete teleprinter exchange switching system;

FIG. 2, which is in two parts A and B, shows the incoming line equipment common to a group of incoming lines or channels, by means of which trains of intelligence characters, constituting teleprinter messages, are received from any one or more of the group of lines or channels and transferred via a common multiplex channel to central equipment;

FIG. 3, which is in 7 parts A . . . G, constitutes a common processing circuit which comprises central common intelligence receiving and retransmitting equipment which is also associated with common intelligence storage equipment which forms no part of the present invention and is not described in detail; while FIG. 4, which is in 3 parts A, B, C, constitutes outgoing line equipment common to a group of outgoing lines or channels and arranged to communicate with the central equipment, FIG. 3, over a multiplex channel.

The system is geared to a basic time cycle having one time-position for each incoming communication channel and for each outgoing communication channel. In the system to be described there are 64 time positions allocated to two groups of 16 incoming channels each and two groups of 16 outgoing channels each.

The method of receiving and storing teleprinter messages is to detect and store each incoming teleprinter character element individually on equipment individual to the incoming channel over which it arrives and for each individual equipment to be asked in turn to send any element it may have in store over a time-division multiplex transmission link IMXL to an individual central temporary store which stores one character before retransmission.

Retransmission can be to a central store capable of storing complete messages until retransmitted, or direct to an outgoing channel.

The present invention is not concerned with methods of storage of complete messages for indefinite periods. However, such methods of storage have already been described in our copending applications Serial Nos. 433,742, now Patent No. 2,952,732, issued Sept. 13, 1960 and 602,608, filed June 1, 1954, and August 7, 1956.

Each group of incoming channels IL, FIG. 1, and each group of outgoing channels OL, FIG. 1, has a matrix ILM, OLM, respectively, of ferromagnetic or ferroelectric, or other bistable, storage cells, having sixteen rows, one individual to each channel in the group and enough cells in each row for storage of the functions to be described. Each matrix has an individual control circuit IMCC, OMCC incorporating a single row of bistable devices or flip-flops for temporarily storing the functional information from any one row of the matrix at a time. Scanning equipment ILMSC, OLMSC for each matrix connects reading and writing equipment to the matrix rows. Scanning equipment individual to each control circuit associates teleprinter signal-responsive equipment in the control circuit to each incoming channel of the associated group in turn during one time cycle of 0.32 millisecond.

Thus the channel groups are scanned in synchronism in a repetitive cycle and, at the moment that each channel in a group is connected to the associated control circuit, its functional information is read from its matrix row and recorded in the associated control circuit.

Assuming that there is no message incoming on a channel, its matrix row will be blank.

A teleprinter character element is twenty milliseconds long: this is equal to the duration of the basic time cycle, which is convenient in practice.

Each group matrix and each line of the group is scanned sixty-four times in the length of one incoming teleprinter character element. Thus the first element of a commencing message on a channel will be detected during the first sixty-fourth part of its length since it starts at any arbitrary moment, but it is required, however, to sample successive elements substantially at their centre. Six columns of the matrix are allocated to form a binary time scale for 64 periods of the control circuit time scale, that is, 20 milliseconds in all.

The six columns correspond to binary digital denominations 1, 2, 4, 8, 16, 32. Each of these columns of course has an individual trigger device in the control circuit IMCC, OMCC, and to count from 1 to 64 on these columns it is necessary to activate the columns in the following combination in order: 1;2; 1 and 2;4; 1 and 4;2 and 4; 1,2 and 4;8; 1 and 8; and so on up to 2,4,8,16,32; 1,2,4,8,16,32; and then all columns back to zero for the full count of 64. The control circuit is arranged to operate the time scale in this manner in response to pulses from the line circuit (i.e. channel) in successive associations with the control circuit and the particular line circuit in question.

As stated above, it is desired to examine each teleprinter character element on the line in the middle of its normal duration of 20 milliseconds, that is at 10 milliseconds after it has commenced. This means that an examining position must be established in relation to the first character element detected, which is the start element constituted by a space. The circuit is therefore arranged that when the start element is first detected, a "1" condition is immediately inserted in the 6th column of the time scale, half-way through the cycle.

Successive associations with the line circuit are then counted until the first 5 columns of the time scale are all in the "1" condition, as well as the sixth column. This means that although only 32 associations have been counted, the time scale shows a complete count of 64 and examination equipment is operated. The time scale is now returned to normal and in each subsequent count starts with the whole time scale in zero position so that a complete period is counted from the middle of one character element to the middle of the next.

The extent of the delay after the detection of the start element can of course be varied as desired, but the successive period after the first examination point has been established will always be a full time scale period.

Each element, mark or space, will be stored as "0" or "1" in the bistable device of a character element column and will remain there until the row is interrogated from the central control equipment, which due to the timing, will always happen before the next element on the line is examined.

Meanwhile the time scale will be restored to zero and will continue to precess at each association until 64 is again reached when the trunk will again be examined. In the meantime the stored element will have been sent over the multiplex link in a manner to be described, and the new element condition will be stored until called for. This sequence will continue until a complete character has been received, and retransmitted when an end-of-character signal from the central control will cause the functional information for the matrix row corresponding to the line in question to be zeroised until the beginning of another character is detected on the trunk.

It will be appreciated that, as is usual with common operating circuits associated with a group of user circuits and a like group of matrix storage rows, the different users (in this case, the incoming lines) will be in different stages of their functional operation at any moment in time and the functional information stored in the different rows at any moment will likewise be different so that the common operating circuit will at each different association during a cycle perform different functions for the different users determined by the information received from an individual user and its matrix row.

The central control again comprises a common operating circuit CCC and a matrix store CCM. A first set of four columns is allocated to channel (line) numbers in binary notation, the four digits allowing for numbers up to sixteen. There are sixty four rows allocated to four groups of sixteen, so that each of the numbers 1–16 will appear in four rows, which can be regularly or arbitrarily spaced. The second set of columns stores the number of the group to which the channel in question belongs so that four rows containing the same individual channel number will contain four different group numbers.

The third set of columns records the number of elements of a character in the central store during its reception, element by element, over the incoming multiplex link, while the fourth set of columns stores the five elements of a character.

So far the information to be stored is required for both incoming messages and outgoing messages, but as the functional operation differs somewhat for the two types of messages, a fifth set of columns stores the type of channel concerned (incoming or outgoing).

Messages may be retransmitted in reverse order, starting with the end of message signal.

The overall sequence is broadly as follows: Each incoming character element on a channel is stored in the line circuit, and transmitted over the incoming multiplex link when requested. At the centre, the successive elements of a complete character are temporarily stored in the control matrix CCM and then the characters are transferred to a central message store CMS. In retransmission each character of the message is sent from CMS to CCM and then sent element by element over the outgoing link to outgoing line matrix stores which control retransmission element by element to the respective lines. The several groups of incoming channels are separately monitored for stored character elements. Separate supervisory channels are used to control the operation of the group control circuits, and only one outgoing control circuit and one incoming control circuit are operative during any one multiplex cycle for element transmission to and from the central control matrix.

Each character transferred to the link store CCM of an outgoing channel is transferred element by element to the individual outgoing channel store in OLM in a manner similar to that described for transfer of elements from an incoming channel store ILM to the link store CCM, and each element is transmitted over the outgoing channel at teleprinter speed.

The outgoing control circuit OMCC is similar to the incoming control circuit IMCC, and is associated with a storage matrix OLM serving 16 outgoing channels, a row of the matrix for each channel.

For 7-unit operation (start element plus 5 intelligence elements plus a single stop element) the outgoing control circuit would be straightforward in operation, but 7½ unit operation, in which the stop element is 1½ units (30 milliseconds) long, is a more difficult problem.

In order to deal with this situation, using the basic 20 millisecond time cycle, alternate characters are assigned 140 and 160 milliseconds respectively by the central control for the character transmission, and it is the function of the outgoing channel control circuit to extend the 140 milliseconds of one character to 150 by 10 milliseconds, which it abstracts from the 160 milliseconds of the other character. The two characters require 300 milliseconds between them for sending.

The outgoing channel control circuit thus has a number of sets of column circuits which function as follows: the first circuit maintains a record that a message transmission is in progress on the corresponding outgoing channel. This condition for this channel is brought down into the common circuit during every cycle of the access selector associated with the matrix for controlling the transmission of the message over the channel. A second column circuit is used to record the element condition in transit. This condition is used to control through one or other of a pair of gates (for mark and space respectively), the condition of a telegraph relay feeding the outgoing channel for transmitting the message. A third column circuit is used to control the transmission of the alternate characters, being operated for, say, the odd-numbered characters from the start of message, and reset for the even-numbered characters, throughout the message.

The timing of the transmission of elements on the outgoing channels is controlled by one or the other of two sets of pulses at 20 millisecond intervals derived from the basic time scale that is used to drive the central control access selector, the two sets referred to being interleaved at 10 millisecond intervals. Which one of these sets is used for transmitting a particular character is determined by the condition of the third column circuit ("odd" or "even" character control) which is added in to the controls for the "mark" and "space" pair of gates referred to, so as to cause direct or delayed transmission according to the character. Thus, the start of transmission of all the elements of the even characters is delayed by 10 milliseconds, which period of time is added on to the odd characters, so that both characters are finally allowed a period of 150 milliseconds for their transmission.

It seems desirable at this point to describe briefly the functional arrangement of a matrix store; a full and illustrated description in the case of a ferrite matrix store may be found in the article entitled "A Magnetic Core Matrix Store with Direct Selection using Magnetic Core Switch Matrix" by W. Renwick published in volume 104, Part B of the Proceedings of the Institution of Electrical Engineers (57) (Paper 2236R). At the same time, it should be clear that a ferrite or other magnetic core matrix store of the type referred to is only one form of store to which the invention may be applied, other forms being magneto-strictive delay lines, mercury delay lines, and various others.

As has been said, each row of the matrix is allocated to a different user in a group of users (lines or channels, for example) equal in number to the number of rows, so that each user has an individual row allocated to him. In the case of the line circuit matrices, and in fact in the case of the central link matrices also, the users are the individual incoming and outgoing lines (channels).

Each matrix has a single control circuit; the control circuit is the active operating device while the matrix fulfills a storage, or pigeon hole, function only. The method of association between the single control circuit, the matrix rows, and the equal number of lines is that the control circuit is provided with a scanning switch ("Access Selector") which scans all the lines in turn in a time cycle which is continuously repeated. The control circuit has a bistable trigger device or flip-flop individual to each column of the matrix and there is a scanning device for the rows of the matrix which scans the rows continuously in synchronism with the scanning of the lines, so that at the moment that a particular line is connected to the control circuit, its own row in the matrix is being scanned by the matrix scanning device.

There is one essential part of the equipment which has not yet been mentioned and that is the means for generating electrical pulses or wave forms for operating the electro magnetic cells of the matrix. These cells are magnetic annuli each of which is threaded by a horizontal row wire which passes through all the annuli in the same row, and a column wire which passes through all the annuli in the same column.

It will be appreciated that the respective annuli in a row have as their function the storage of a corresponding element of functional information so that a row can store as many different functional information elements as there are annuli in the row (and therefore columns in the matrix). When it is required to transfer the information in a row to the control circuit, the elements from the individual annuli are all transferred at the same time by putting a so-called "read" pulse or waveform on the row wire of sufficient potential to cause an annulus to change from the "1" condition to the "0" condition on its hysteresis loop. If an element changes its condition it generates a pulse in the column wire and this pulse is used to operate the trigger device in the control circuit connected to that column wire via an amplifier. Thus in response to a "read" pulse on a row wire, only those trigger devices in the control circuit are operated which correspond to annuli in the row which were in the "1" condition.

On the other hand, to "write" the condition of the trigger devices in the control circuit at the end of the individual association of the control circuit with a particular line and its storage row, into a storage row, the condition of each trigger device must regulate the way in which the corresponding annulus is operated. For this purpose the energy required to operate an annulus is split between the row wire and the column wire. So-called "half-write" pulses or wave forms are applied, in synchronism, respectively on the row wire and on a selection of the column wires corresponding to trigger devices in the "1" condition. The result is that only those annuli corresponding to operated trigger devices in the control circuit are operated to the "1" condition. The annuli in a row then remain in that condition for a complete scanning cycle until the same line is again individually connected to the control circuit, at which time the functional information corresponding to that line is transferred from its storage row to the control circuit. The control circuit operates in accordance with the condition of the line to which it is now connected and the corresponding functional information from the storage row and again transfers the new set of functional information back to the storage row at the end of that individual association.

Thus the control circuit during a complete cycle will perform up to 16 different operations in association with 16 different lines and their individual storage rows, returning modified information to the storage rows at the end of each operation.

The generation of reading and writing wave forms is an art in itself and a detailed description of a particular method of generating such wave forms suitable for use in the present invention is described in the above-mentioned article by W. Renwick.

The complete set of wave-forms for use in a full cycle of operation of the matrix and its control circuit consists of sixteen pairs of individual "full read" and "half-write" pulses, the pulses in each pair being in sequence, the read pulse being followed by the half-write pulse, and these two pulses being positioned near the beginning and the end respectively of each period of association of the control circuit with a line (and, in synchronism, of each period of association of the matrix scanner with a row). The wave-form generator thus generates a succession consisting of "read"; "half-write"; "read"; "half-write" and so on pulses timed in synchronism with the line cycle. The complete sequence is applied to the matrix scanner so that each successive pair of waveforms is applied to successive row wires. All the "read" waveforms are extracted and applied as a complete read sequence R to various control points in the matrix control circuit, and similarly all the "half-write" waveforms are extracted and applied as a complete sequence W to other control points in the control circuit.

Before proceeding with the detailed description of the circuit diagrams some explanation of the circuit conventions is required.

Electronic gates, well-known per se, are shown as circles with incoming controls shown as radial leads with arrow-heads touching the circle. Outputs are shown as radius leads with arrow-heads pointing radially outwards. The number inside the circle indicates the total number of controls which must be energised for the gate to deliver an output; for instance, if there are four controls and the number in the circle is 2, then the gate will deliver an output when any two of its controls are energised.

Where a short line is drawn across a control lead, it means that when that control is energised the gate cannot deliver an output however many of its other controls are energised. The energisation of such a control may be said to inhibit the gate of which it forms part. Gates are given references beginning with the letter G.

A flip-flop of the bistable type is essentially a two stage multi-stable register in that the device is capable of assuming one of two conditions, "on" or "off." The flip-flop devices are indicated by the reference F.

If the flip-flop and other circuit outputs were connected to all the gates which they control there would be a complex network of leads which would be difficult to follow. These leads have therefore been omitted and the short control leads to the gates have been given references with a small $f$ and suffixes determined by the flip-flop or other circuit concerned by the unit of the flip-flop energising the lead. Thus flip-flop F11 can energise lead $f111$ or lead $f112$, the final 1 or 2 indicating which unit of the flip-flop is energising the lead.

Continuing now with the main description, reference is made to the incoming line circuit in FIGURE 2 having sections A and B, which should be placed side by side, section A on the left. The lines IL of the group of incoming lines served by memory matrix ILM, each row of which is individually associated with a corresponding line of the group, are repeatedly scanned via scanner ILSC in synchronism with the scanning of the matrix rows by scanner ILMSC so that each line is scanned at the time that its matrix row is individually connected to the matrix control circuit IMCC.

Assume that an incoming line has been idle and a start character "Space" of a new message appears thereon. During the next time position in which this line is examined via ILSC, potential will be applied via lead ILC, and in conjunction with the writing waveform, 2W, will operate gate 21SG. Trigger 21F for the first column is at 21f0, indicating nil storage for this particular line in column 1, and providing a positive control for 21SG'. A "1" condition is thus written by 21WA in conjunction with the half-write waveform via ILMSC into the character cell individual to the line. At the same time the potential via ILC also co-operates with waveform 2W to open gate 27SG (FIG. 2B) so that in turn 27WG is opened and a "1" condition is written by 27WA into the corresponding cell. Pulse 2W also co-operates with 21f1 and 27f1 to open gates 21FG and 27FG so that 21F and 27F return to the "0" condition immediately after the writing operation is complete.

At the next connection of the same line via ILSC to ILC and of the corresponding matrix row to the control circuit IMCC, the pulse 2R and 21RG initiates the operational sequence for the time position, in conjunction with a readout pulse generated on the character column wire as a result of a read waveform on the row wire via ILMSC. The coincidence of pulses on gates 21RG causes the application of potential to the amplifier 21RA, which in turn operates bistable device 21F to the "1" condition. Similarly, 27RA operates 27F to the "1" condition.

When the 2W pulse arrives in IMCC, the coincidence of 22f0, 21f1, and 2W opens gate 22WG while the coincidence of 21f1 in conjunction with 2W opens gate 21WG, so that the cells of the first and second columns belonging to the particular line row are energised to the "1" condition.

Since 21F is now in the "1" condition, gate 27WG cannot be opened and it is necessary to re-write the "1" condition into the 7th column by other means. As previously described it is necessary to maintain the cell in the 6th column of the counter (7th column of the matrix) in the "1" condition until a count of 31 has been made on columns 1 to 5 of the counter (these columns co-operating with amplifiers 22 . . . 26). When the count of 31 has been achieved, all the triggers 22 to 26 will be in the "1" condition, but at every stage before that at least one of the triggers 22F . . . 26F will be in the "0" condition.

A gate 27PG is therefore provided of the "OR" type controlled by 22f0 . . . 26f0, so that the gate will open when any one or more of the five triggers in question is in the "0" condition. The output from 27PG co-operates with potentials applied by 21F and 27F when in the "1" condition and with 2W waveform to open a further gate 27QG and so apply a "half-write" condition via 27WA to the respective column wire to cause the number 6 cell of the counter store to assume the "1" condition. This same combination of gates 27PF—27QG will continue to control the storage of the "1" condition in the 6th counter column after each association once every trigger 22F . . . 26F is operated. The 2W pulse in conjunction with 21f1, 22f1 or 27f1 operates gates 21FG, 22FG, 27FG respectively to return 21F, 22F, 27F to "0" position.

In the next time position for incoming line IL, the read pulse on the row creates a "1" condition on columns 1, 2 and 7 and 21RA, 22RA, 27RA respond, in turn operating 21F, 22F, 27F to the "1" position. When the 2W pulse arrives, as before, write pulses are applied to columns 1 and 7. However, since 22F is now in condition "1," 22WG will not be operated. Instead, the combination of 21f1 and 22f1, with 23f0 and 2W, operates gates 23WG. Writing pulses are therefore applied to columns 1, 3 and 7 only, to cause the corresponding cells in the particular row to change to condition "1." Triggers 21F, 22F, and 27F return to "0" condition towards the end of 2W.

At the next association of IMCC with the incoming line in question, the read pulse results in operating 21F, 23F and 27F to condition "1." Since 22F is in condition "0" the coincidence of 21f1, 22f0 and 2W will again operate 22WG and the coincidence of 21f1, 22f0, 23f1 and 2W operate gate 23QG. As before, we now get writing pulses applied via 21WA, 22WA (via 22WG), 23WA (via 23QG), 27WA, so that the cells in columns 1, 2, 3, 7 are operated.

On the next association, the read operation results in the operation of triggers 21F, 22F, 23F, 27F to condition "1." The application of the "half-write" waveform now results in columns 21, 24, 27 only being affected. Gates 22WG, 23WG, and 23QG are not opened because 22F, 23F are both in condition "1" so that column 22, 23 are not affected. Column 24 is energised because 21F, 22F, 23F are all in the "1" condition and 24F is in the "0" condition so that gate 24WG is opened.

It will be seen that, so far, as the result of successive associations, columns 22 alone; 23 alone; 22 and 23 together; 24 alone; have been energised, out of columns 22 . . . 26. It will also be seen that each writing amplifier 23WA . . . 26WA is controlled by two (for 23WA) or three gates WG, PG, QG, the controls on which are so arranged that the ordinary laws of binary addition are followed up to a count of 31.

We shall not describe each operation but resume when the cells 21, 23 . . . 26, 27 of the matrix row in question are in the "1" condition, indicating a count of 30 (0+2+4+8+16=30). (Note that column 27 does not count in this addition, although normally representing 32, since the count started at that point).

On the next association, the triggers 21F, 23F . . . 27F are operated to condition "1" on read-out. At the end of this association, gate 22WG opens in response to the 2W pulse in conjunction with 21f1 and 22f0; gate 23QG opens in response to 2W with 21f1, 22f0, 23f1; 24PG and 24QG open; 25PG and 25QG open; 26PG, 26QG open; and 27PG, 27QG open. In consequence the cells 21 . . . 27 are all operated to condition "1."

On the next association, triggers 21F . . . 27F are operated to the "1" condition. When the write pulse arrives a write pulse will be applied to column wire 21, but not to any of the wires 22 . . . 27, since every gate controlling access to these wires depends on at least one of triggers 22F . . . 27F being in the "0" condition, whereas during this association all these triggers 22F . . . 27F are in the "1" condition.

On the other hand, gate 28QG is now able to examine the condition of the incoming line, via 28PG. The 6 conditions 22f1 . . . 27f1 are present and the seventh condition necessary to open gate 28QG depends on whether a "space" potential or a "mark" potential is applied to 28PG from the line via ILSC to lead ILC. If a "space" element is being transmitted, gates 28PG, 28QG open and a "1" condition is written into cell 28; if a "mark" element is being transmitted, the gates are not opened and cell 28 is left in the "0" condition.

Since cell 21 is now in condition "1," the counter will recommence its cycle from the beginning on the next association and will count successive associations up to 64, when the examination of the line takes place. Before this happens, however, the condition of the line stored in 28 must be sent to the central link. It will be seen that, once cell 28 has been energised, the "1" condition will alternate between the storage cell 28 and the trigger 28F since gate 28WG is solely controlled by 2W and 28f1, until gate 28KG is opened.

The condition of trigger device 28F is interrogated at intervals from the central link (FIG. 3) which interrogates all the incoming lines in a pre-determined manner under strict time control.

As previously stated the central link equipment works on a time cycle of 20 milliseconds which has 64 time positions each of which is of 0.32 millisecond duration and each of which is individually allocated to an incoming line or an outgoing line. The control circuit of the central link is connected to each incoming line group control circuit IMCC by an interrogation channel forming part of IMXL. 16 consecutive time positions of the 20 milliseconds cycle are allocated to each incoming line group, each of the 16 being individually assigned to a particular line in the group.

It will be remembered that the time cycle of the incoming line circuit is itself of 0.32 millisecond duration, that is, the cycle time of the line circuit is equal in duration to a single time position of the link circuit. Each incoming line has a time position in its local time cycle of 0.02 millisecond, and of course these time positions are spread through the local time cycle. It is necessary for a particular line to be interrogated during its own time position in the local time cycle, and for this purpose the central link has to send an interrogation signal in different positions in the 0.32 millisecond time positions of the central time cycle so that interrogation signals synchronise with the 0.02 millisecond association time of the individual lines to the local control circuit IMCC. This comprises a series of 16 time position cycles in each of which an interrogation signal is being sent in the 1st, 2nd . . . 16th time position. The signal in any one cycle can therefore only interrogate its own line. The way in which this is carried out will be explained in connection with the link equipment but it will be seen on FIG. 2 that the channel 31G carrying the interrogation signals is connected in parallel to the restoring circuit of trigger 28F and to gate 28IG.

It will be seen that gate 28IG is also controlled by 28f1 and its output 22G is connected via a second signal channel back to the central link equipment (FIG. 3). If therefore trigger 28F is in the "1" condition indicating that a space had been found on the line, gate 28IG is opened and a signal is transmitted back indicating a space character element. If a mark element had been on the line, 28F would have been in condition "0" and no signal would be transmitted back over the line 22G. The action of 31G to the reset circuit of 28F restores 28F to the "0" condition after a short delay sufficient to allow the return signal over 22G if necessary.

It will be understood that the interrogation of all the line stores in one incoming line group will take place in 16 time positions, that is one-quarter of the central time cycle.

The second incoming line group is similarly interrogated during another quarter of the central time cycle of 20 milliseconds over a separate interrogation channel and return signals are sent over a separate return channel.

As previously stated, the "1" condition of cell 21 in a row corresponding to a line, of which transmission has been detected, is maintained after each successive completion of a count by columns 22 to 27. It must be understood that for the second and later operations of the counter, cell 27 is not energised at the beginning of the count since 21F is already in the "1" condition and therefore gate 27WG will not open. This means that the counter will have to perform its complete count of 64 associations before all the triggers 22F . . . 27F are again all in the "1" condition to initiate examination of the line. This means that although the line was examined 10 milliseconds after the start element was initially detected in order that examination of the line should be located in the centre of the character element, each further count will be of 20 milliseconds duration so as to cover the time between the mid-points of successive elements.

Successive examinations continue until the central link equipment has recorded the 5 intelligence elements of a character. The link equipment then transmits an "end of character" signal over a further channel 32G in exactly the same time relation in regard to the lines as has been described for the interrogation signals. This channel is connected to the reset circuit of trigger 21F so as to return it to the "0" condition during an association of the control circuit IMCC with the line in question. The return of 21F to the "0" condition prevents the operation of any cells in the respective matrix row at the end of this association and the control circuit becomes quiescent as regards that particular line until the start element of the next character appears on the line.

Figure 3A:
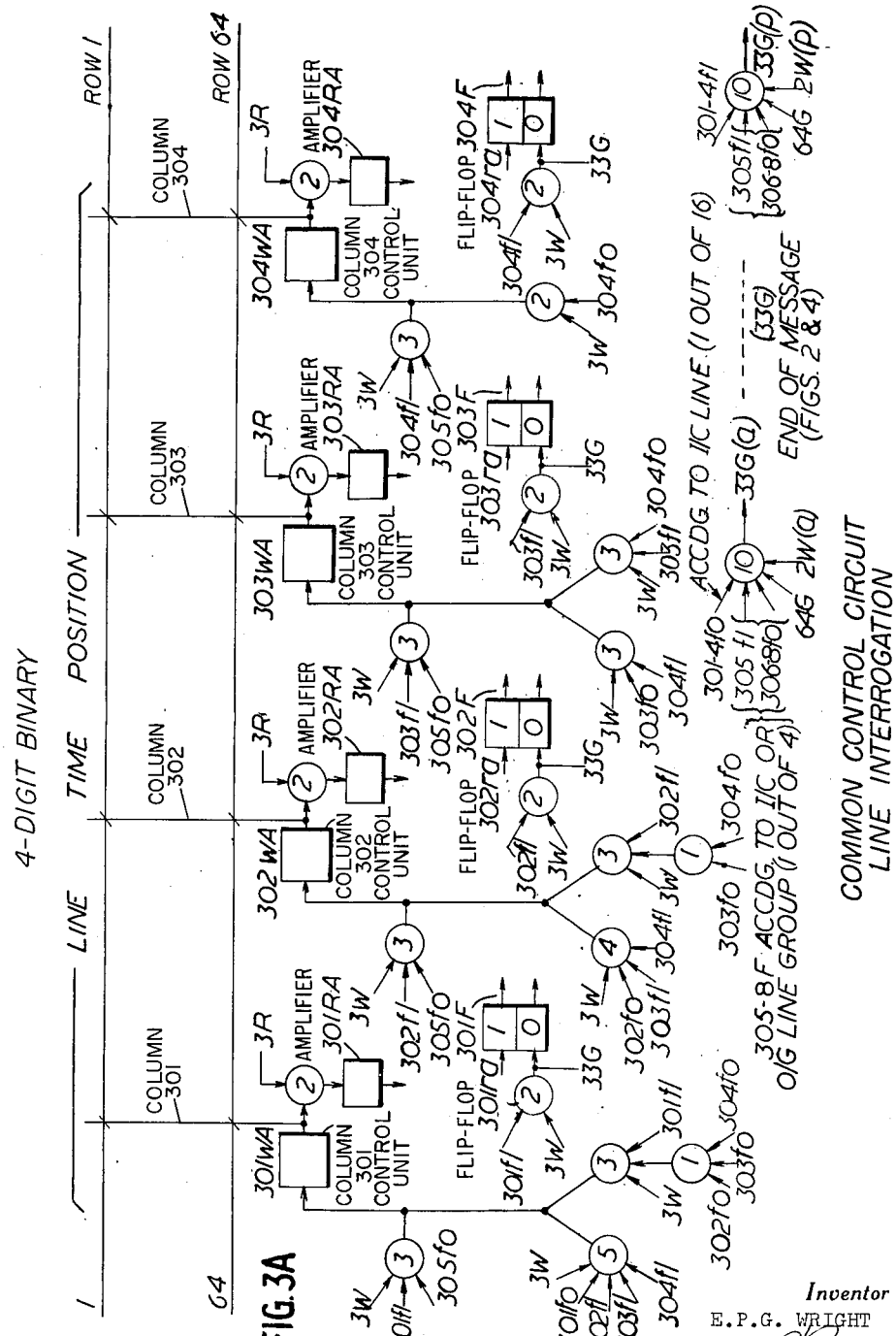
Figure 3D:
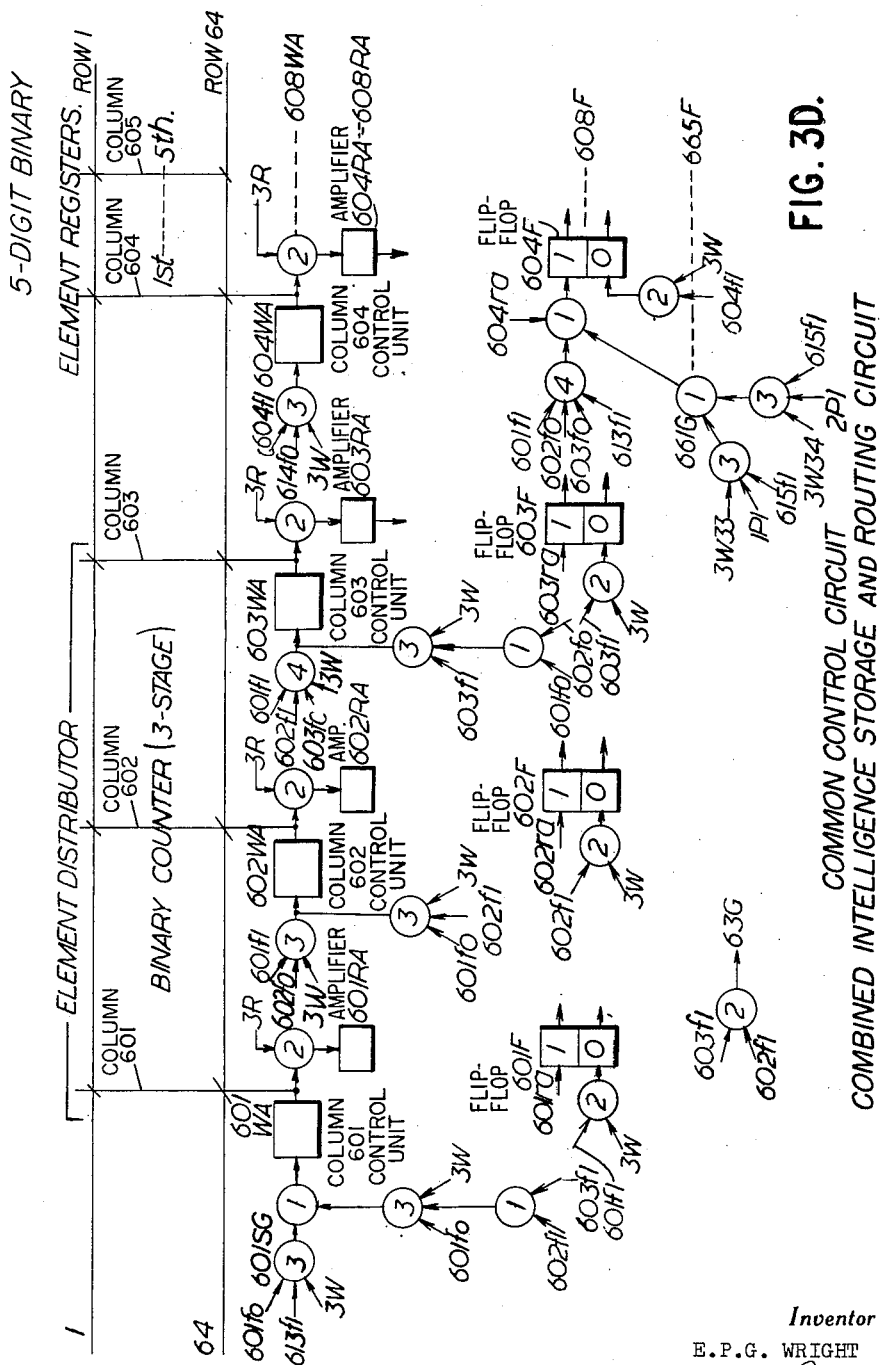
Figure 3E:
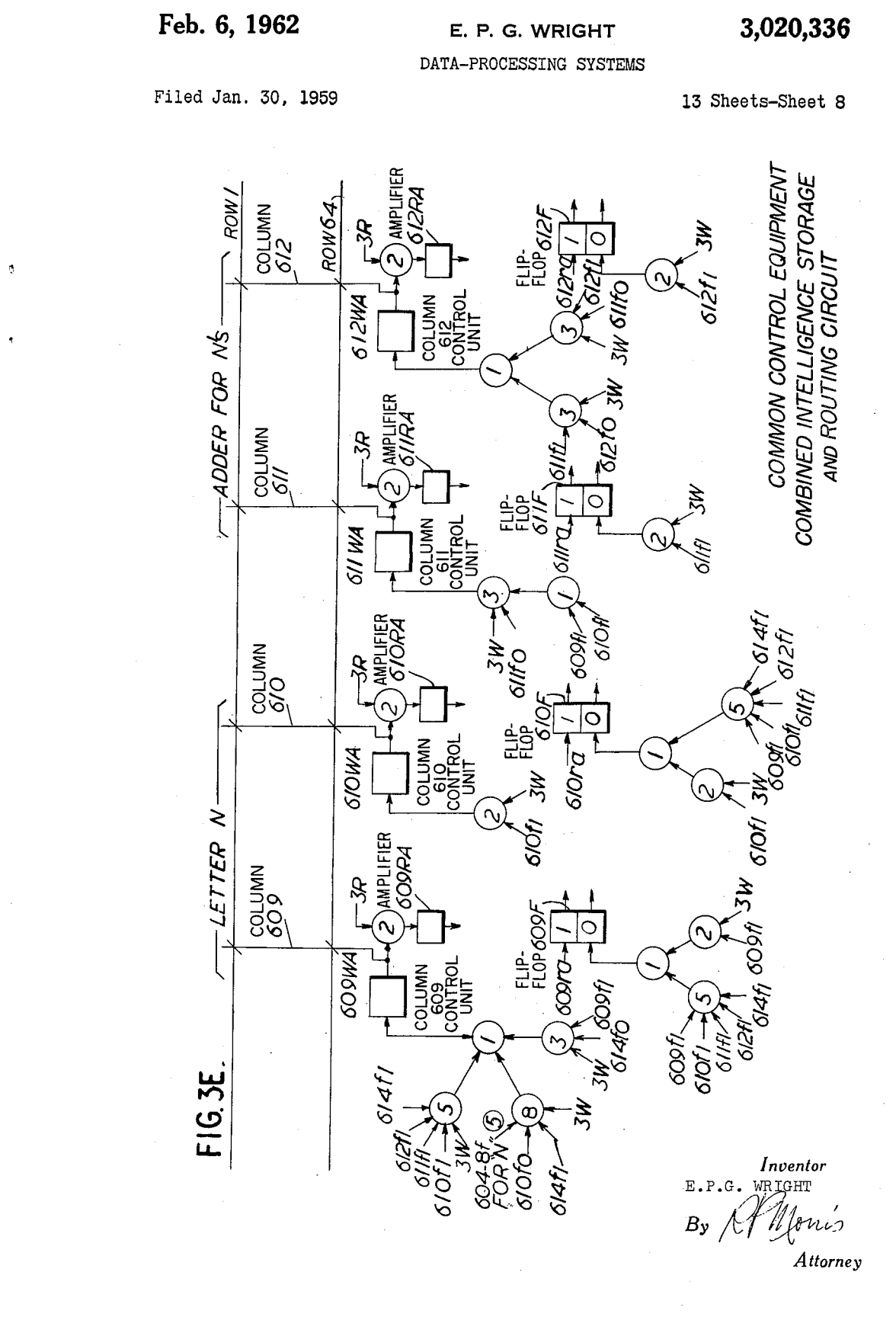
Figure 4B:
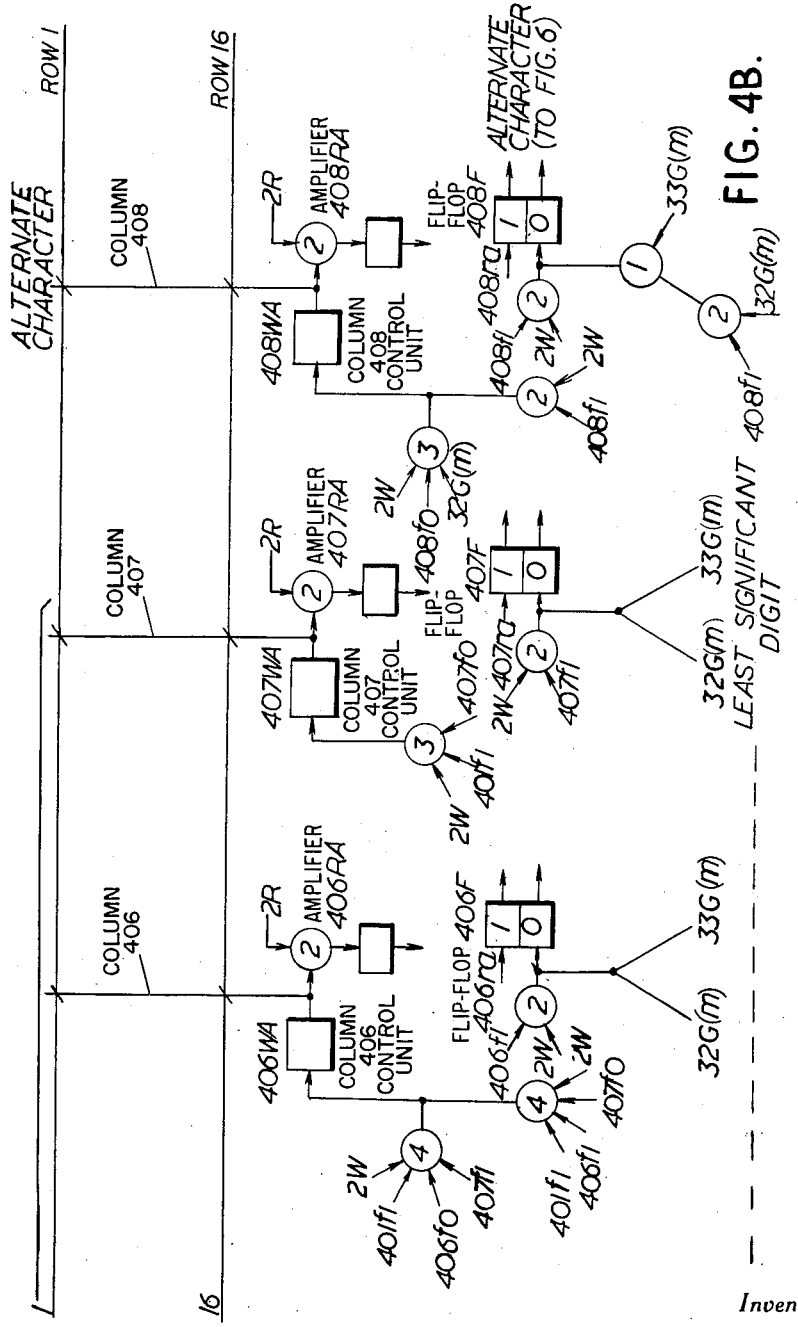

The generation of the interrogating signals in the link circuit is performed by the equipment shown in FIGS. 3A and 3B, which should be placed side by side with FIG. 3A on the left. This equipment consists of 8 columns 301 to 308 of the link matrix having 64 rows of cells, together with the single control circuit. The first 4 cells 301 to 304 in each row contain a line number within its own group in binary form. This means that each group of 16 rows counting from the top to the bottom contains in turn the binary numbers 1 to 16 consecutively to cover the 4 groups of incoming and outgoing lines.

Columns 305 to 308 are individually allocated to the 4 groups so that the cells 305 of the top 16 rows will be in the "1" condition while the cells 306 to 308 are in the "0" condition: similarly for the second group of 16 rows, the cells 306 only of these four columns will be in the "1" condition: and so on.

It is to be understood that 64 pairs of "read" and "half-write" waveforms are generated for the control of this equipment and are applied via a 64 outlet scanner to the row wires of the matrix, as well as being used as controls in the control circuit.

Assuming that the matrix scanner is about to start scanning from the top of the matrix, a "read" waveform is applied to row wire 1. Since the cells 301 to 304 of this row contain binary digit 1 only cell 301 is in the "1" condition so that, in response to the "read" waveform, only trigger device 301F will be operated via amplifier 301RA, triggers 302 to 304 remaining in the "0" condition.

It will be seen in FIG. 3B that there are 16 gates 31AG . . . 31PG of which only the A, B, H, P gates are actually shown. Each of these gates is controlled from the triggers 301F to 304F in accordance with the binary numbers 0 to 15.

In the present circumstances with none of these triggers in the "1" condition, gate 31AG will be opened when the waveform 2WA is applied.

It will be noted that the gates 31AG . . . 31PG have different waveform controls 2WA . . . 2WP, which are the "write" waveforms used in the line circuit. It will be remembered that the cycle duration in the line circuit is 0.32 millisecond and each association in that time cycle has a duration of 0.02 millisecond. It is required to send interrogation signals from the link circuit in synchronism with the association periods in the line circuit and therefore the interrogation signals sent for the various lines must be in different sub-divisions of the 0.32 millisecond association time of the link circuit cycle. For this purpose the 16 "write" waveforms used for the line circuit are also used in generating the interrogation signals in the link circuit in the various time positions required to synchronise with the operation of the line control circuit IMCC. These waveforms have been given the references 2WA . . . 2WP in FIG. 3. It will be seen that the "read" and "half-write" waveforms used for the link circuit time cycle are denoted by 3W and 3R respectively to differentiate them from the quite different "read" and "half-write" waveforms 2W and 2R used in the line circuit FIG. 2.

In addition it will be noted that all the gates 31AG . . . 31PG have additional controls 305f1 and 306 . . . 8f0. These identical controls for all these gates relate the gates to the same line group; therefore, there will be another similar set of gates for the second incoming line group and the two groups of gates will control interrogation signals over different signal channels to the different line group control circuits IMCC.

Reverting to the description of the operation the gate 31AG is opened at a time position within the time period of the first line in the first incoming line group and a scanning pulse will be generated over the outgoing lead 31AG and applied via interrogation channel to gate 28IG as previously described.

Towards the end of the 0.32 millisecond association time in FIG. 3 the "half-write" waveform 3W will occur, but as the line number in question is zero, nothing will be re-written into the top row of columns 301 to 304.

It is to be understood that while the contents of columns 1 to 4 were read out the contents of columns 5 to 8 were also read out, in response to which trigger 305F was operated to the "1" condition whereas triggers 306F . . . 308F remain in the "0" condition, thus creating the control conditions for gates 31AG . . . 31PG discussed above.

When the scanning device for the link matrix reaches row 2, the line number 1 will be read out on to trigger 301F to 304F and gate 31BG will be operated to send an interrogation signal in time position 2WB.

In this way interrogation signals are sent in turn in the 0.02 millisecond time position of the successive lines in the line circuit, during successive 0.32 millisecond time positions of the link circuit time cycle.

Of course, during each over-all time cycle of the link circuit, sets of interrogation signals will be sent during first and second groups of 16 time positions to the two incoming line groups respectively.

It will be appreciated that on the occurrence of each "half-write" waveform 3W, those triggers 301F . . . 308F which are in the "1" condition are returned to the "0" condition via their respective gates so that these triggers are then ready to receive the numbers read out of the next row of the matrix.

The characters are recorded on columns 604 to 608 of the link matrix. These columns record the combined intelligence elements of each character, the start and stop elements not being recorded.

The receipt of the successive elements of a character, starting with the start element in this case, are counted on columns 601 to 603 in binary manner, and this counter controls the routing of the successive character elements to the respective columns 604 to 608. The character signals are of course received at different time positions in the 0.32 millisecond time divisions of the link time cycle, but this is immaterial since they are all allocated between the 3R and 3W waveforms.

The character elements are signalled from the line circuit IMCC by the presence (space) or absence (mark) of signal on the return channel (22G) from IMCC. However the start element is, of course, space and therefore results in a positive signal. The 22G signals over the return channel are applied to gate 613SG which opens and operates trigger 613F to the "1" condition. On the occurrence of the 3W waveform, gate 601SG (FIG. 3D) is operated by coincidence of 3W with 601f0, since trigger 601F is at normal, and with 613f1, since 613F has responded to the space signal. As a result, the top cell in column 601 is operated to the "1" condition. The link circuit continues through the remainder of its cycle, during which time the receipt of another character element from the number 1 line will have been recorded in the line matrix. When the link scanner again reaches row 1 the application of the "read" waveform thereto will send a pulse down column 1 to cause amplifier 601RA to operate trigger 601F. It must be pointed out that, as usual, all link control circuit triggers are returned to normal at the end of each association by respective circuits controlled by 3W and connected to their "0" operating circuit. Thus 613F is at normal when the line store under examination is again interrogated, and accordingly as the first intelligent element of the character is space or mark the line store will or will not send a return signal to operate trigger 613F. If 613F is operated then gates controlling 604F will be opened to change 604F to condition "1," since 601F is energised and 602F and 603F are in "0" condition. When 3W occurs, however, there will be no circuit for 601WA because 601F is now in the "1" condition. However, the combination of 601f1 and 602f0 with 3W completes a circuit for 602WA to write the "1" condition into the number 1 cell in column 602, thus recording the receipt of the first intelligence element of the character. If no signal had been received on 613F over 22G, indicating a mark, the cell in column 604 would have been left in "0" condition.

The next character element received will be directed to 605F due to the arrangement of the gate controls for 604F . . . 608F, the read-out from the matrix having operated 602F to the "1" condition during this association. 3W in conjunction with 601f0 will energise column 601 and the coincidence of 602f1 and 601f0 causes a signal to be applied to column 602 as well.

In the next association the three character elements will be stored in column 606 and afterwards the "1" condition will be applied to column 603 only due to 601f1, 602f1 and 603f0 being in coincidence with 3W. No potential is applied to 601 or 602 since both triggers 601F and 602F are in condition "1." The character elements are stored in the remainder of columns 604 to 608, the binary counter operating in normal manner to create the respective access routes to the successive elements.

The stop character is the 7th character and is received in the 7th association which results in columns 601, 602 and 603 being energised. On the next association therefore the triggers 601F, 602F, 603F are all operated to condition "1" and this results in the energisation of trigger 614F during waveform 2WA to signal "end-of-character." 2WA is chosen to control this operation in order that 614F will be operated near the beginning of the association period.

The operation of 614F results in the application of a control signal 63G to gates 32AG . . . 32PG (FIG. 3C). These gates are controlled by the number triggers 301F to 304F, the group triggers 305F to 308F and individual write pulses from the line circuit 2WA to 2WP. In consequence, an end-of-character signal will be generated from that one of the gates 32AG . . . 32PG corresponding to that particular line of the group whose operations are being dealt with, and the operations of the selected gates results in the end-of-character signal being sent back over a signal channel to the line circuit to return trigger 21F to the "0" condition so that no further operation of the line circuit IMCC in relation to that particular line will take place until the commencement of another character is detected on that line.

We have now described how to transfer characters from any one of a number of incoming channels to corresponding matrix rows at a central position, scanning the intelligence items incoming on the channels at one rate, and transferring the items to the central matrix rows by a scanning operation at a slower, but related rate. The above equipment can be used for various purposes. An important purpose is for providing the incoming portion of a teleprinter exchange system in which the messages are stored before retransmission; but the incoming teleprinter characters could be data required for any purpose in the data processing field. In the case of teleprinter exchange systems, the receiving equipment can be drum storage equipment of the type described in our noted copending applications. Later we shall describe the return of the message characters from the further storage equipment in retransmission to an outgoing line. The selection of a message for retransmission forms no part of the present invention, but a method by which this can be performed is again described in the above specifications.

It is proposed to retransmit each character received on a link matrix row via a pattern movement register. It will therefore be necessary to provide means for transferring characters from the individual matrix rows to individual pattern movement registers. This will consist of 32 sets of 5 gates each, one set for each line of the two groups of outgoing lines. One only of these sets of gates is shown, in FIG. 3G, by means of its first and last gates 666G and 670G, the controls on each being representative of those for all the sets. It will be seen that each gate is controlled by the following controls, some of which are fixed for a group of gates and others of which vary according to the element in question.

The first control on gate 666G is 604f1, and this control means that the gate will only be opened if the first intelligence element of the character is a space. Similarly 605f1 . . . 608f1 control the other four gates for the remaining intelligence elements. The second control, which is 614f1 determines that the gate can only be opened when "end-of-character" has been recorded. The third control 615f0 merely checks that in fact the character is in a row belonging to an incoming line and not an outgoing line. The trigger 615F is, of course, controlled by column 615 in which only the cells corresponding to outgoing lines are permanently in the "1" condition, the cells corresponding to incoming lines being permanently in the "0" condition. Thus the 5 gates will set the pattern movement register PMR according to the character recorded immediately after the last element of the character has been received. The gates of each group of 5 will also have additional common controls (not shown) which characterise the individual incoming line and its group so that only characters received from a particular line are transferred to its individual pattern movement register. These pattern movement registers can be considered as the line pattern movement registers in the above specifications from which the characters are serially transferred to the storage drum.

Columns 609 to 612 provide for detecting and counting a predetermined succession of letters "N" which is used in this system as an end-of-message indication. These columns are arranged to detect an "N" and to count successive "N's", returning to normal after recording one or more "N's" if the next character received is not an "N" and if the count so far is insufficient. Thus the counter will be operating partially at arbitrary moments throughout the message but will only operate effectively at the end of message. When the counter is completely operated by the end of message set of "N's", an end-of-message signal can be generated for any desired supervisory purpose.

We have now described the complete reception and storage of a message. For transmitting an outgoing message the description will again start at pattern movement registers individual to outgoing lines, it being assumed that the selection of messages to be sent and the transmission of individual characters of the messages to the individual pattern movement registers of the outgoing lines takes place in the manner described in the above specifications.

The pattern movement registers control a set of gates for operating the triggers 604F . . . 608F (FIG. 3D) of the character element storage columns. There will be 32 gates for each of the triggers 604F . . . 608F, each controlled by a different one of the individual pattern movement registers. These sets of gates will have time controls individual to the corresponding lines in the time cycle of the link matrix, the writing waveforms of the link matrix being used for these purposes in the same way that we have previously used the writing waveforms of the line matrix for time control purposes. The individual writing waveforms will be termed 3W33 . . . 3W64 since the outgoing lines have been allocated the lower half of the matrix which corresponds to the second half of the time cycle and therefore corresponds to the second group of 32 waveforms in the complete cycle of 64.

Thus the gates controlling 604F are respectively controlled by 3W33 ... 3W64, 1P1 ... 32P1 (these being the first stage controls from the pattern movement registers) and by 615f1 for all the gates (this determining that the matrix row associated does in fact belong to an outgoing line).

The gates controlling the trigger 605F for the second element would have the same controls except that the controls from the pattern movement registers would now be 1P2, 2P2 ... 32P2, while the gates for 608F would have the same time controls, and would also be controlled by 615f1 but the pattern movement register control would be 1P5 ... 32P5.

It will be seen therefore that on the next association of the particular outgoing line with the control circuit, the gates corresponding to those stages of the pattern register in the "1" condition are opened and the corresponding triggers in the group 604F ... 608F are operated to the "1" condition. Immediately following this operation, the pattern movement registers control the respective writing circuits so that the character pattern is written into the element register cells of the matrix row corresponding to the outgoing line on which the message is to be sent.

The message is sent back in reverse so that the end-of-message characters, consisting of a series of "N's", arrive initially in turn. As previously stated, these operate the equipment associated with columns 609 and 610 and eventually operate trigger 610F to the "1" condition to indicate complete receipt of this series. These end-of-message characters are not sent out, but have only been used in order to create the start condition in the link circuit for message retransmission.

When the next character is received in the matrix, it is now transmitted to the outgoing line circuit element by element preceded by a "start" element, which is, of course, a space signal, which is created by the apparatus in FIG. 3G as follows: The decision as to whether a space or mark is to be sent is made by two groups of gates collectively designated 61G and 62G respectively, both sets of gates comprising six "and" gates in parallel followed by an "or" gate, the first of the 61G "and" gates creating the start element. This element is interpolated into the character so that its gate is not controlled by any one of the character element register triggers. The gate has four controls, one of which is 610f1 referred to above, and the other three represent the character element counter in the zero position. The other five gates of 61G are controlled by successive positions of the character element counter 601F ... 603F and respectively by the successive element register triggers 604F ... 608F in the "1" condition. The first 5 "and" gates of 62G have the same controls as the last 5 "and" gates of 61G except that the controls by the character element cells 604F ... 608F are in the "0" condition, indicating mark instead of space. The sixth "and" gate of 62G is to create the stop element, which is, of course, a mark, and this, like the start element gate only has four controls as this element is interpolated.

It will be clear, therefore, that on the next association of the outgoing line row in question, the control circuit 610F is operated and therefore with the counter 601 ... 603F in zero position, a space signal is generated via the multiple 34G (1 to 32). This multiple leads to 32 gates, 34G (1 to 32), for the transmission of spaces in the time positions individual to the outgoing lines in the outgoing line circuit time cycle. Thus 34G1 is controlled by 2WA, the lead from 61G, controls 301f0 ... 304f0 indicating the first line in the group and 305f0 ... 307f0 together with 308f1, which together indicate the outgoing group in question which is the last group of the four. The other gates of the 32 have varying time position controls, the controls 2WA ... 2WP being used twice over for the two groups of 16, the particular one of which is indicated by the group number also forming part of the controls. A similar set of gates 35G (1 to 32) is also provided for the transmission of marks for the 32 outgoing lines. These two sets are provided because the marks and spaces are both sent positively by pulses on separate channels to the outgoing line circuit, and different pairs of channels are used for the two outgoing line groups.

This means that the start signal for the first line of group four is sent in the 49th time division of the link time cycle and is sent in the first 0.02 millisecond subdivision of that 0.32 millisecond division. How this is used in the line circuit will be described separately.

The fact that 610F is in the "1" condition and the end-of-character trigger 614F is in the "0" condition applies an operating condition to 613F to bring it to the "1" condition, which in co-operation with 601f0 and 3W writes the "1" condition in the 601 cell of the line row, thus recording the transmission of the start element.

On the next association 601F will be operated to the "1" condition as well as the character pattern in the triggers 604F ... 608F since 601F is in the "1" condition. The second "and" gate of 61G or the first "and" gate of 62G, depending on whether the first intelligence element is "spaced" or "mark," will open and apply operating control to the respective one of the 34G or 35G gates to transmit the first intelligent element. As previously described the writing operation at the end of this association will put a 1 in the 602 column but will leave the 601 column empty, so that on the third association 602F will be operated to the "1" condition and the second intelligence element will control transmission. In the same way the 3, 4 and 5 intelligence elements are sent at the end of which the counter is in the 7th position so that on the next association 601F is in the "0" condition while 602F and 603F are in the "1" condition (it must be remembered that the first position of the counter is 0,0,0 so that the 7th position is binary 6, corresponding to the operation of 602F and 603F only). With this condition the stop element is sent out by the 6th "and" gate of 62G.

It will be appreciated that each of these elements is sent out in the same relevant time position in successive cycles of the link matrix, which has a 20 milliseconds duration. In consequence, the element signals are sent to the line circuit at 20 milliseconds spacing, which corresponds to the length of a teleprinter signal. This means that the signal spacing received by the line circuit allows of direct creation of teleprinter character elements in sequence on an outgoing line as will be explained later.

When the first character after the end of message signal is received on the link matrix and the corresponding bistable devices 604F ... 608F are operated to the "1" condition on the next association, the corresponding "end of character" gate 32G is operated due to the fact that the binary adder 601 ... 603 which has counted the character elements now has 602F and 603F in the "1" condition so that a pulse is applied via a gate over a lead 63G (FIG. 3D) to the gates 32G. Since that one of the bistable devices 305F ... 308F corresponding to the outgoing line group in question is in the "1" condition, as well as those of the devices 301F ... 304F corresponding to the particular line in binary code are in the "1" condition, the correct gate 32G is operated to send an "end-of-character" signal to the outgoing line circuit in the correct time position for the line in question. In the line circuit, FIG. 4, this applies writing potential via 401WA to the character control column. On the next association of the line row in question with OMCC, device 401F is operated to the "1" condition via 401RA.

It will be remembered that the transmission of spaces and marks from the link circuit FIG. 3 is via controls 34G (spaces) and 35G (mark). It will be seen that these controls are applied to AND gates also controlled by the writing waveform 2W applied to writing amplifiers 410WA and 409WA respectively, so that successive character elements will operate the correct column cell for space or mark respectively.

The first element will be the start element which is a space and therefore the cell in column 410 is energised.

At the same time 32G in association with 408f0 and 2W applies potential via 408WA to column 408 to energise the alternate character cell for the line. Both 401 and 408 have re-operate gates controlled by 2W and by 401f1 and 408f1 respectively so that the operated condition is maintained throughout the character.

Since 408F is in the "1" condition the last two gates of the train of three gates indicated 42G, of which one is provided per line, are directly opened by 408f1 and 410f1 in the time position of the line concerned to apply a pulse to the teleprinter relay of the outgoing line to operate it to the space condition so that it will transmit the start element.

During the transmission of the start element—and of every other successive element—a binary counter 403 . . . 407 operates, of which 407 is the least significant digit. The first time 401F is energised to the "1" condition the writing waveform 2W in conjunction with 401f1 and 407f0 applies potential via amplifier 407WA to column 407 to count 1. Counting proceeds to 406 . . . 403 in the manner previously described for counters 22 to 27.

When the counter completes its cycle and all the bistable devices 403F . . . 407F are simultaneously energised the "OR" gate controlling an operating circuit for column 410 is shut so that the "1" condition is not written into that column any more. This does not affect the transmission of the space element on the line, since the relay used is side-stable. It will be assumed that the next element is a mark so that the transmission of this element via 35G will write the "1" condition in the column 409. On the next association 409F will be energized to condition "1," and since 408F is still in the "1" condition potential will be immediately applied to 41G in the line concerned to change over the teleprinter relay and so terminate the start element and being the first intelligence element.

In the same way the remaining elements are sent. Counter 403 . . . 407 has continued to precess continuously performing a complete cycle twice per element. It will be seen that 401 continues to remain in the "1" condition until the 33G condition is applied to its resetting circuit at the end of the message.

The first character sent out from the link is 140 milliseconds long and the end of character signal on 32G in co-operation with 408f1 resets 408F to the "0" condition. The fact that 408 is now in the "0" condition means that the 6-condition gates controlling 41G and 42G now become operative and the start element of the next character cannot be applied to the line until the counter 403 . . . 407 has completed an additional cycle of 10 milliseconds. This means that the stop element of the first character has been extended to 30 milliseconds. As previously stated all even characters are sent from the link with a stop element of 40 milliseconds. The fact that the 6-condition gates are now in control causes all change-overs between elements to be delayed by 10 milliseconds in the even characters so that although each of the first cycle elements of the even character is applied to the line for 20 milliseconds the delay affects the stop signal of 40 milliseconds, reducing it to 30 milliseconds. In this way a regular 7½ unit code is retransmitted.

The arrangements for transmission of character elements from the line circuit store to the link store in response to interrogation signals from the link can be applied to the transmission of character elements or the like from way-stations on an omnibus line to a link store terminating the omnibus line. Each way-station would be responsive to an interrogation signal in a particular time position in the cycle in exactly the same way that the various rows of the line circuit matrix are arranged to respond to interrogation in a unique time position. The way stations would be arranged to store character elements or the like temporarily and to retransmit them in response to a characteristic interrogation signal from the terminating store circuit. The present invention can therefore be applied to groups of way-stations on a single line as well as to groups of lines carrying individual stations.

What I claim is:

1. A data processing system comprising incoming and outgoing lines, incoming and outgoing line circuits common to a number of said lines, each including line stores individual to the lines for storing items of intelligence, there being a single store for each line, central apparatus common to the lines and including a plurality of central stores, an incoming connecting circuit between the incoming line circuit and the central stores, an outgoing connecting circuit between the outgoing line circuit and the central stores, and control equipment in the central apparatus responsive to a signal on a line for scanning the incoming lines and operating said incoming and outgoing circuits for causing the sequential transfer of items of intelligence from the incoming lines to the outgoing lines through the incoming and outgoing line stores and the central stores.

2. A data processing system comprising incoming and outgoing lines, incoming and outgoing line circuits common to a number of lines, each including line stores individual to the lines for storing items of intelligence, there being a single store for each line, central apparatus common to the lines and including a plurality of central stores, an incoming connecting circuit between the incoming line circuit and the central stores, an outgoing connecting circuit between the outgoing line circuit and the central stores, means responsive to a signal on a line for sequentially examining the incoming lines for the presence of intelligence therein in accordance with a fixed time cycle at a first repetition frequency, the periodic time of the cycle, which is available for the examination of each line circuit, being small in comparison with the duration of an elementary item of intelligence present on any line, means for transferring items of intelligence present in any examined line to its respective line store, means for sequentially examining the line stores in accordance with a fixed time cycle at a second repetition frequency, lower than said first frequency, for the presence of stored items of intelligence therein, and means for transferring items of intelligence stored in individual line stores to the central store over said incoming connecting circuit.

3. A system, as claimed in claim 2, wherein the said items of intelligence stored in the central store include information indicative of a desired outgoing line, means responsive to the said storage of intelligence in the central store and including the outgoing connecting circuit for transferring the items of intelligence stored in the central store to the line store of the desired line in accordance with a fixed time cycle at the said second repetition frequency, and means for transferring the items of intelligence stored in the outgoing line store to the outgoing line in accordance with a fixed time cycle at the said first repetition frequency.

4. A system, as claimed in claim 2, in which the first and the second repetition frequencies are so related that the periodic time of the line examining cycle for each group of incoming lines multiplied by the total number of incoming and outgoing lines is equal to the periodic time of the store examining cycle.

5. A system, as claimed in claim 1, in which said line and central stores comprise ferrite matrices having columns and rows, horizontal row scanning equipment for generating a periodic succession of "read" and "half-write" pulses and for transmitting said pulses to said matrices, column control means for respective columns of said matrices, means for setting any column control means in accordance with said "read" pulses, and means controlled by the said setting of the said column control means and the said "half-write" pulses for controlling the recording of intelligence in the rows associated with the column of the last-said column control means.

6. A data processing system comprising input channels, output channels and a connecting circuit common to a plurality of input channels and output channels, individual stores for said input and output channels for storing items of intelligence, there being a single set of said stores for said input channels and a single set of said stores for said output channels, said connecting circuit including a group of central stores for storing items of intelligence, means for transferring items of intelligence from said input channels to said individual stores, means for transferring items of intelligence from said individual stores to corresponding stores in said connecting circuit, both said transferring means being responsive to a signal on an input channel, whereby items of intelligence may be transferred between an incoming channel and an outgoing channel, and means in said equipment for scanning said individual stores at one rate and for scanning said connecting circuit stores at a slower, but related, rate.

7. A message switching system comprising a plurality of incoming and outgoing lines and a connecting circuit, means for assigning each of said lines having a time position in a fixed cycle of time having a first repetition frequency, means for assigning to said connecting circuit a plurality of time positions at a second fixed repetition frequency, first and second storage matrices associated with said lines and said connecting circuit, respectively, means for assigning to each line an individual storage position in each of said matrices, means responsive to a signal on a line for sampling each of said incoming lines at said first repetition rate for the presence of messages thereon and for storing messages element by element in said first storage matrix, and means for sampling said first matrix positions at said second repetition rate and for simultaneously storing a group of elements in said second matrix in positions corresponding to the sampled incoming lines.

8. In a switching system, as set forth in claim 7, means for simultaneously transferring the group of elements stored in the incoming line positions in the second matrix to outgoing line positions therein, and means for transferring, element by element, the group of elements stored in the outgoing line positions in the second matrix to the outgoing line positions in the said first matrix.

9. A system, as claimed in claim 7, in which the said messages are transferred in constant total permutation code, and in which the said group of elements comprises a character of the said code.

10. A system, as claimed in claim 9, wherein the messages transferred from said second matrix to said first matrix comprise teleprinter messages in standard 7½ unit constant total permutation code having a duration of 150 milliseconds per character with the transferring of messages from the second matrix to the first being controlled by a time scale having a repetition period of 20 milliseconds, and wherein means is provided for transferring characters in pairs, each character occupying 150 milliseconds.

11. A system, as claimed in claim 10, wherein the said means for transmitting characters in pairs comprises means for allocating periods of time of 140 milliseconds and 160 milliseconds respectively to the characters comprising the pair, and wherein means is provided for delaying the first character of the pair by 10 milliseconds, which period of time is abstracted from the second character, whereby each character is transmitted with a duration of 150 milliseconds.

References Cited in the file of this patent

UNITED STATES PATENTS

| | | |
|---|---|---|
| 2,816,169 | Pawley | Dec. 10, 1957 |
| 2,952,732 | Wright et al. | Sept. 13, 1960 |